US011250633B2

(12) United States Patent
Yoshimura

(10) Patent No.: US 11,250,633 B2
(45) Date of Patent: Feb. 15, 2022

(54) IMAGE PROCESSING APPARATUS, DISPLAY METHOD, AND NON-TRANSITORY COMPUTER-READABLE STORAGE MEDIUM, FOR DISPLAYING A VIRTUAL VIEWPOINT IMAGE INCLUDING AN OBJECT AT DIFFERENT POINTS IN TIME

(71) Applicant: CANON KABUSHIKI KAISHA, Tokyo (JP)

(72) Inventor: Yuri Yoshimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/918,954

(22) Filed: Jul. 1, 2020

(65) Prior Publication Data
US 2021/0005023 A1  Jan. 7, 2021

(30) Foreign Application Priority Data

Jul. 5, 2019  (JP) .............................. JP2019-126338

(51) Int. Cl.
*G06T 19/00* (2011.01)
*G06T 7/55* (2017.01)
*G06F 3/01* (2006.01)

(52) U.S. Cl.
CPC ............ *G06T 19/006* (2013.01); *G06F 3/013* (2013.01); *G06T 7/55* (2017.01); *G06T 2200/24* (2013.01);
(Continued)

(58) Field of Classification Search
CPC ..... G06T 19/006; G06T 7/55; G06T 2200/24; G06T 2207/10016; G06T 11/60;
(Continued)

(56) References Cited

U.S. PATENT DOCUMENTS

2004/0125115 A1* 7/2004 Takeshima .............. G06T 13/80
  345/634
2010/0039447 A1* 2/2010 Nakao .................... H04N 1/387
  345/634
2018/0182114 A1* 6/2018 Hanamoto ................ G06T 7/60

FOREIGN PATENT DOCUMENTS

JP  H07162744 A  6/1995
JP  2014215828 A  11/2014

OTHER PUBLICATIONS

Adrian Hilton, Jean-Yves Guillemaut, Joe Kilner, Oliver Grau, and Graham Thomas, Free-Viewpoint Video for TV Sport Production, 2010, in Image and Geometry Processing for 3-D Cinematography, Springer, Berlin, Heidelberg, pp. 77-106. (Year: 2010).*

* cited by examiner

*Primary Examiner* — Jeffery A Brier
(74) *Attorney, Agent, or Firm* — Canon U.S.A., Inc. IP Division

(57) ABSTRACT

A trajectory generation management unit determines a target foreground object based on a user's input operation for selecting a target foreground object. The trajectory generation management unit determines a time range to generate a trajectory image based on the user operation. A trajectory calculating unit calculates a trajectory of the target foreground object in the determined time range. A virtual viewpoint determining unit determines virtual viewpoint information based on the trajectory. An image generating unit determines plot times in the time range based on a user's plotting operation. The image generating unit generates a trajectory image based on the determined plot times.

17 Claims, 10 Drawing Sheets

(52) U.S. Cl.
CPC ............... *G06T 2207/10016* (2013.01); *G06T 2207/30224* (2013.01)

(58) Field of Classification Search
CPC ........ G06F 3/013; H04N 13/00; H04N 13/10; H04N 13/106; H04N 13/111; H04N 13/117
See application file for complete search history.

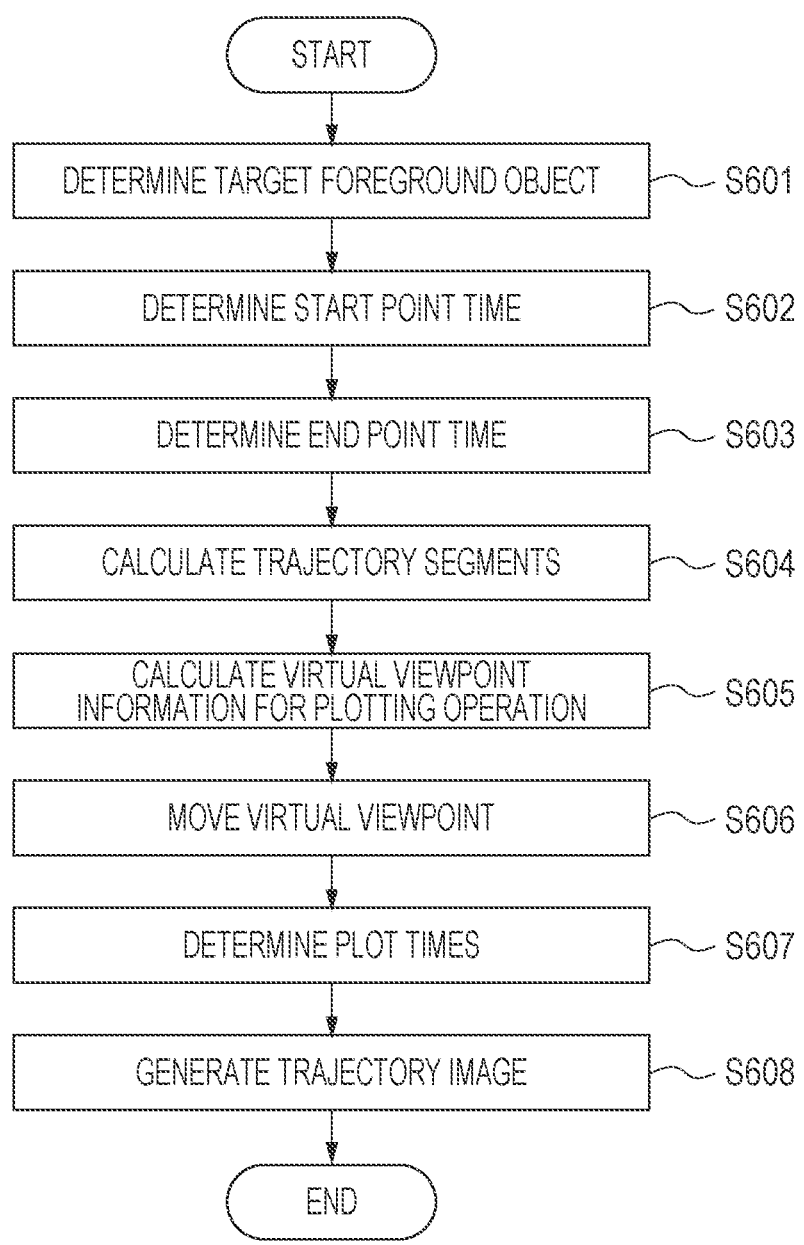

ogy to, for a specific object of which images are continuously captured, enable a comparable virtual viewpoint image, containing images of the specific object at different points in time and viewed from a desired viewpoint, to be displayed.

IMAGE PROCESSING APPARATUS, DISPLAY METHOD, AND NON-TRANSITORY COMPUTER-READABLE STORAGE MEDIUM, FOR DISPLAYING A VIRTUAL VIEWPOINT IMAGE INCLUDING AN OBJECT AT DIFFERENT POINTS IN TIME

BACKGROUND

Field of the Disclosure

The present disclosure relates to a technology for generating a virtual viewpoint image.

Description of the Related Art

There is a technology for generating a virtual viewpoint image by using multiple captured images obtained by synchronously capturing images of an object with multiple image capturing apparatuses installed at different locations. With this technology, not only an image viewed from the installation location of each image capturing apparatus but also an image viewed from any viewpoint (virtual viewpoint) in an image capturing area can be generated.

A virtual viewpoint image is generated by performing image processing such as shape data generation and rendering of a three dimensional model or the like by using multiple images captured by multiple image capturing apparatuses. Japanese Patent Laid-Open No. 2014-215828 describes an image data reproducing system that includes multiple image capturing apparatuses arranged so as to surround an image capturing area and that generates and displays a virtual viewpoint image for any viewpoint by using captured images of the image capturing area. The image data reproducing apparatus described in Japanese Patent Laid-Open No. 2014-215828 enables users to designate viewpoints and generates virtual viewpoint images viewed from the viewpoints designated by the users. Thus, users are able to, for example, watch sports events or concerts while seeing virtual viewpoint images viewed from desired viewpoints. Generated virtual viewpoint images are also distributed to user terminals and viewed.

Since virtual viewpoint images enable users to acquire images viewed from desired viewpoints, virtual viewpoint images are expected to be used for analysis or the like on plays, forms, and the like of sports events. At this time, it is assumed to, for example, analyze how the form of a specific player has changed by comparing the player seen in a currently displayed virtual viewpoint image with the player seen in a virtual viewpoint image at time a second before. 1n this case, the image data reproducing system described in Japanese Patent Laid-Open No. 2014-215828 enables a method in which not only a currently displayed virtual viewpoint image but also a virtual viewpoint image at time a second before is generated and then the two virtual viewpoint images are visually compared with each other. However, with the above-described method, multiple virtual viewpoint images at different times are generated while time is changed and then the multiple virtual viewpoint images are compared visually, for example. For this reason, it takes time to do comparison work.

SUMMARY

The present disclosure is made to address the above inconvenience. The present disclosure provides a technol- According to one aspect of the present disclosure, there is provided an image processing apparatus comprising: an obtaining unit configured to obtain three dimensional shape data of an object, the three dimensional shape data being generated based on multiple images captured by multiple image capturing apparatuses; a determining unit configured to determine a line-of-sight direction of a virtual viewpoint of a virtual viewpoint image that is generated based on the multiple captured images; and a generating unit configured to, based on the line-of-sight direction of the virtual viewpoint, determined by the determining unit, and multiple pieces of the three dimensional shape data that are obtained by the obtaining unit and that respectively represent images of the object at different points in time in a period during which images of the object are continuously captured by the multiple image capturing apparatuses, generate a virtual viewpoint image containing the images of the object at the different points in time.

According to another aspect of the present disclosure, there is provided a display method comprising: determining a line-of-sight direction of a virtual viewpoint of a virtual viewpoint image based on multiple images captured by multiple image capturing apparatuses; and displaying, based on the determined line-of-sight direction of the virtual viewpoint and multiple pieces of three dimensional shape data that respectively represent images of an object at different points in time in a period during which images of the object are continuously captured by the multiple image capturing apparatuses, a virtual viewpoint image containing the images of the object at the different points in time.

According to another aspect of the present disclosure, there is provided a non-transitory, computer-readable storage medium storing a program for causing a computer to execute a method, the method comprising: determining a line-of-sight direction of a virtual viewpoint of a virtual viewpoint image based on multiple images captured by multiple image capturing apparatuses; and displaying, based on the determined line-of-sight direction of the virtual viewpoint and multiple pieces of three dimensional shape data that respectively represent images of an object at different points in time in a period during which images of the object are continuously captured by the multiple image capturing apparatuses, a virtual viewpoint image containing the images of the object at the different points in time.

Further features of the present disclosure will become apparent from the following description of exemplary embodiments with reference to the attached drawings.

BRIEF DESCRIPTION OF THE DRAWINGS

FIG. 6 is a flowchart for illustrating a trajectory image generating process that is executed by the image processing apparatus.

DESCRIPTION OF THE EMBODIMENTS

Hereinafter, an embodiment of the present disclosure will be described with reference to the attached drawings. Components that will be described in the following embodiment provide an example embodiment of the present disclosure and are not intended to limit the scope of the present disclosure to those components.

Figure 8:
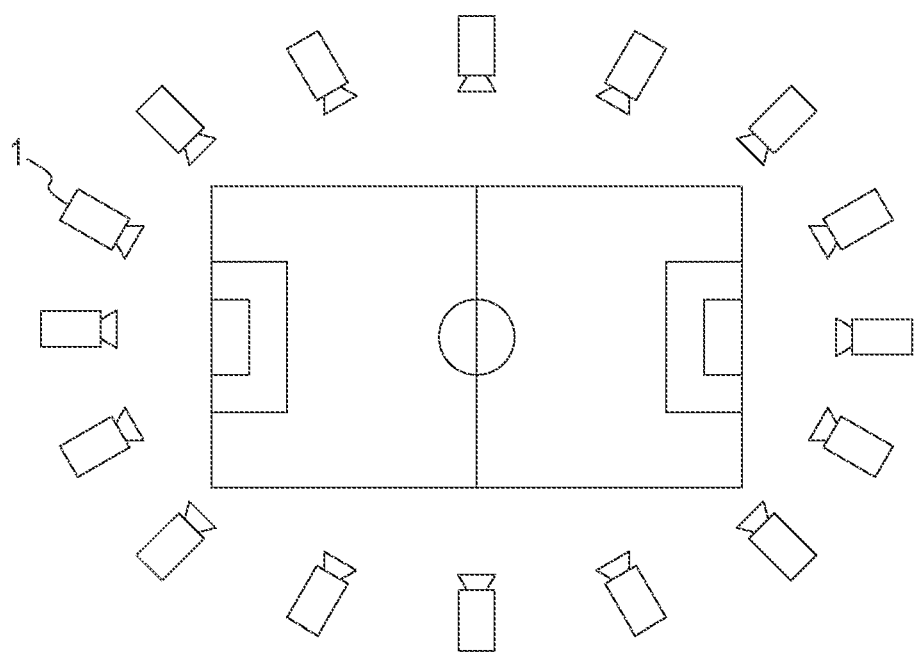
FIG. 8 is a view showing an example of the arrangement of image capturing apparatuses.

In the present embodiment, an image processing apparatus 100 that generates a virtual viewpoint image of a specific object of which images are captured by multiple image processing apparatuses will be described. A virtual viewpoint image makes it easy to recognize temporal changes of the object. A virtual viewpoint image is an image showing, in accordance with multiple images captured by the multiple image capturing apparatuses and any designated viewpoint (virtual viewpoint), a view from the designated virtual viewpoint. The multiple image capturing apparatuses like, for example, image capturing apparatuses 1 as shown in FIG. 8 may be arranged so as to surround an image capturing area; however, the arrangement and the number of image capturing apparatuses are not limited to this example. A virtual viewpoint image in the present embodiment, which is also called free viewpoint video, is not limited to an image for a viewpoint freely (any viewpoint) designated by a user and also includes, for example, an image for a viewpoint selected by a user from among multiple candidates. A virtual viewpoint image in the present embodiment is a still image. It is possible to generate a virtual viewpoint moving image by combining multiple virtual viewpoint images. In the present embodiment, data for generating a virtual viewpoint image is called material data. Material data corresponds to images captured by the image capturing apparatuses and data generated in accordance with the captured images. Material data is stored in an auxiliary memory device 104 (described later), an external auxiliary memory device 107 (described later), or the like and used at the time of generating a virtual viewpoint image. A type of material data and a method of generating material data will be described in detail later.

Figure 3A:
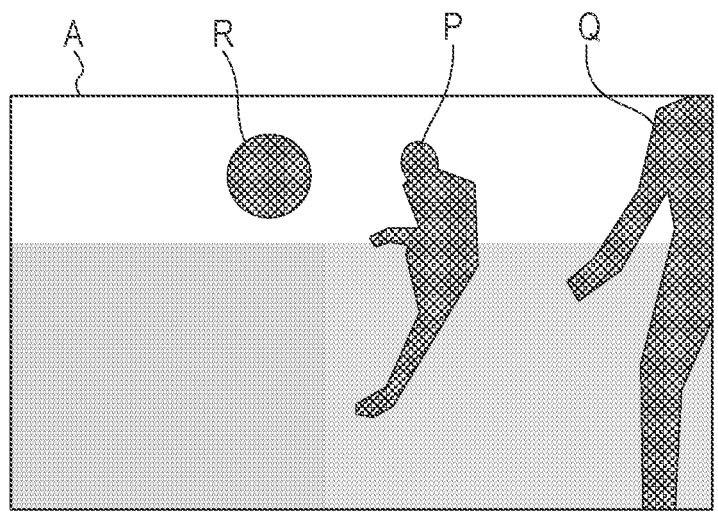
FIG. 3A to FIG. 3D are views for illustrating a process for generating a trajectory image.
Figure 3B:
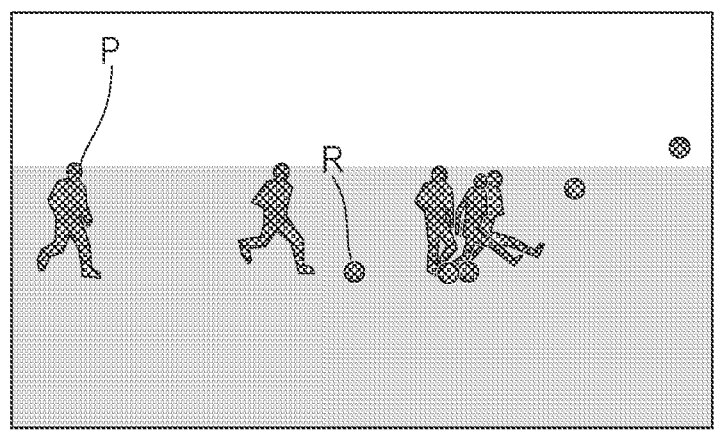

The image processing apparatus 100 in the present embodiment is capable of generating a virtual viewpoint image as a still image containing images of the specific object, captured at different times, as shown in FIG. 3B. In the following description, an image that makes it possible to see how a specific object moves with time as shown in FIG. 3B is called trajectory image.

The hardware configuration of the image processing apparatus 100 in the present embodiment will be described with reference to FIG. 1. The image processing apparatus 100 includes a CPU 101, ROM 102, RAM 103, the auxiliary memory device 104, a communication OF 105, and a bus 106.

Figure 1:
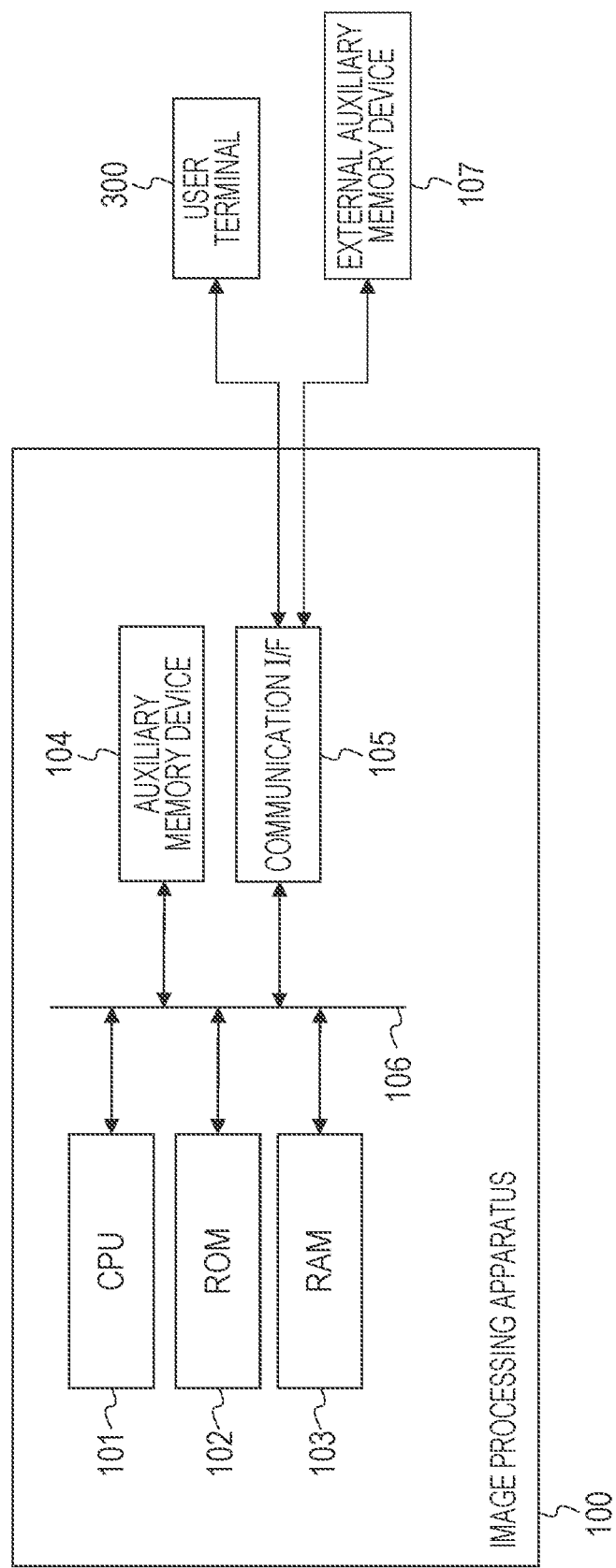
FIG. 1 is a diagram for illustrating the hardware configuration of an image processing apparatus.

The CPU 101 implements the functions of the image processing apparatus 100 shown in FIG. 1 by controlling the overall image processing apparatus 100 by using computer programs and data stored in the ROM 102 or the RAM 103. The image processing apparatus 100 may include one or multiple dedicated pieces of hardware other than the CPU 101, and the one or multiple dedicated pieces of hardware may execute at least part of processes that are executed by the CPU 101. Examples of the pieces of dedicated hardware include an application specific integrated circuit (ASIC), a field programmable gate array (FPGA), and a digital signal processor (DSP). The ROM 102 stores programs, and the like that are not changed. The RAM 103 temporarily stores programs and data that are supplied from the auxiliary memory device 104 and data and the like that are supplied from an external device via the communication 105. The auxiliary memory device 104 is made up of, for example, a hard disk drive or the like, and stores various data, such as image data and speech data.

The communication I/F 105 is used to communicate with a device outside the image processing apparatus 100. For example, when the image processing apparatus 100 is connected to an external device by wire, a cable for communication is connected to the communication I/F 105. When the image processing apparatus 100 has a function to wirelessly communicate with an external device, the communication 105 includes an antenna. The image processing apparatus 100 in the present embodiment communicates with, for example, the externally connected external memory device 107, a user terminal 300 (described later), or the like. The bus 106 connects the components of the image processing apparatus 100 and conveys information.

Figure 2:
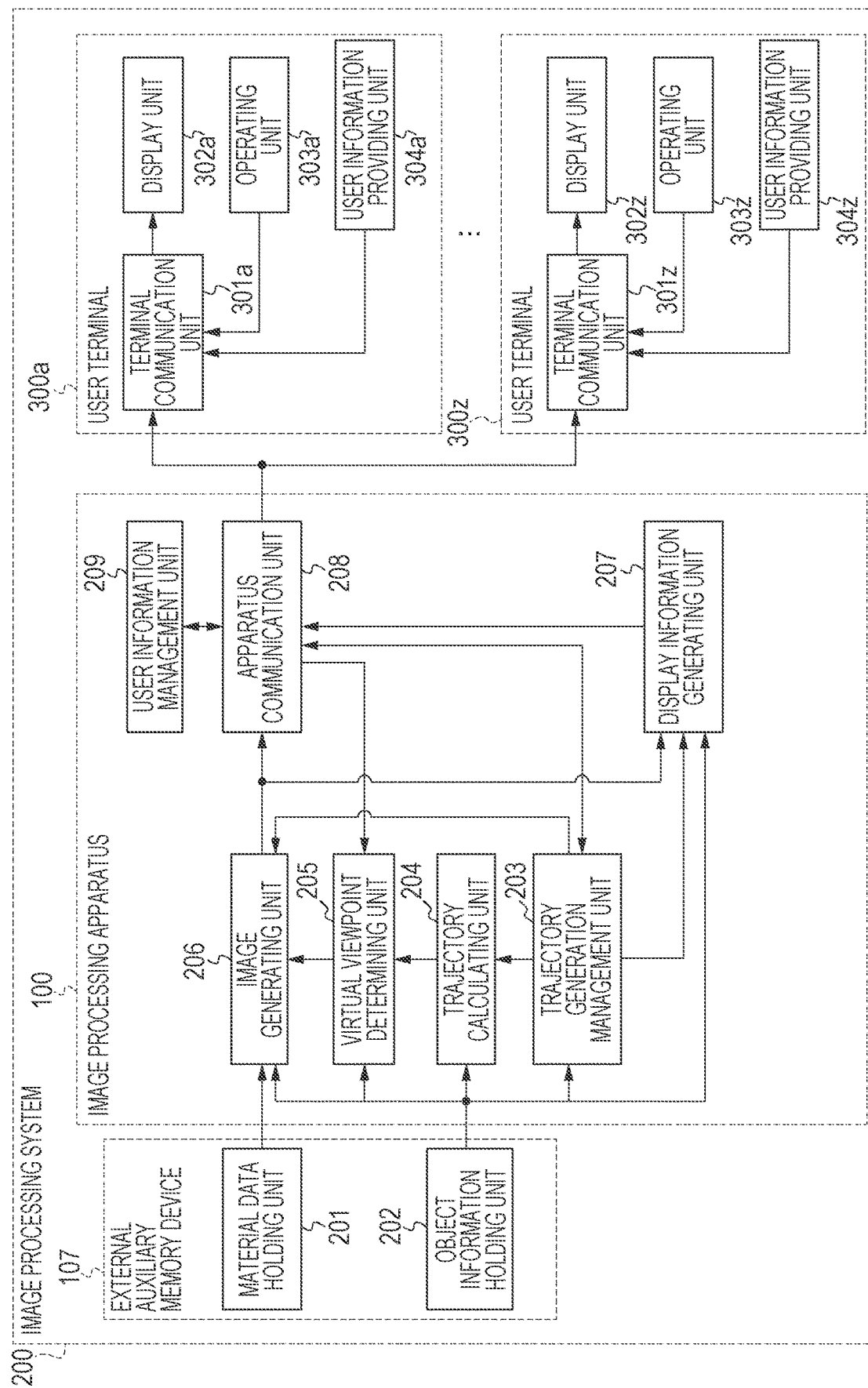
FIG. 2 is a diagram for illustrating the functional configuration of an image processing system.

Next, the functional configuration of the image processing apparatus 100 in the present embodiment will be described with reference to FIG. 2. FIG. 2 is a diagram for illustrating the functional configuration of an image processing system 200 including the image processing apparatus 100. User terminals 300a to 300z in FIG. 2 each correspond to the user terminal 300 in FIG. 1. In the following description, unless otherwise specified, the 26-set user terminals 300a to 300z are not distinguished from one another and are simply referred to as user terminals 300. Components in each user terminal 300 are also similarly not distinguished from one another unless otherwise specified and are respectively referred to as terminal communication unit 301, display unit 302, operating unit 303, and user information providing unit 304.

A material data holding unit 201 and an object information holding unit 202 are holding units included in the external auxiliary memory device 107. The material data holding unit 201 holds material data that is used to generate a virtual viewpoint image and transmits the material data in response to a request from an image generating unit 206 (described later). The object information holding unit 202 holds information on an object (hereinafter, referred to as object information) of which images are captured by multiple image processing apparatuses and transmits the object information to the processing units in the image processing apparatus 100. Objects that are expected as the above-described objects to be captured include, for example, moving objects in image capturing areas like balls and players and, for example, stationary objects in image capturing areas like structures, such as goals that are used in ball sports. In the present embodiment, moving objects are called foreground objects, and stationary objects are called background objects. Examples of expected foreground objects include referees in fields, and singers, players, performers, masters of ceremonies in concerts or entertainment, other than the above examples. Examples of expected background objects include stages in concerts and the like and stadiums that hold events, such as competitions, other than the above examples. Objects to be captured may include other physical objects and the like in addition to foreground objects and background objects. The entire image capturing area may also be regarded as an object to be captured. In the following description, foreground objects and background objects may be collectively referred to as objects. The object information holding unit 202 holds object information of each of objects such as foreground objects and background objects. Object information contains, for example, time information, posture recognition information, identification information, representative point information, and the like for each object. Object information also contains information that relates to the range of the entire image capturing area and that indicates a range in which designation of a virtual viewpoint is enabled. Hereinafter, pieces of information contained in object information will be described.

Time information is information on time at which images of an object are captured by the multiple image capturing apparatuses. Time information is acquired in accordance with, for example, information on a time code that is used at the time when the multiple image capturing apparatuses synchronously capture images, information on image capturing time attached to captured images, a captured image frame number, or the like. Posture recognition information contains, for example, a result obtained by performing posture recognition on an object, such as a player, with machine learning or the like or information used to perform posture recognition. Identification information is information for enabling multiple objects to be identified. When an object is, for example, a soccer player, identification information may contain information indicating the name, number on uniform, team, and the like of the player. Representative point information may contain information on coordinates when an object is indicated by one point, or information used to calculate the coordinates. Any position, such as the position of the center of gravity of an object and a point at which an object contacts with a ground, may be defined as a representative point. Pieces of information contained in object information are described above. Pieces of information contained in object information are not necessarily limited to the above-described examples. Information other than the above may be contained or only selected information from among the above-described pieces of information may be contained as needed. Object information for objects for which no posture recognition or identification is performed like background objects, such as goals, does not contain posture recognition information or identification information. The material data holding unit 201 and the object information holding unit 202 in the present embodiment are included in the external auxiliary memory device 107; however, the configuration is not limited thereto. The image processing apparatus 100 may be configured such that at least one of the material data holding unit 201 and the object information holding unit 202 is included in the image processing apparatus 100.

Processing units for generating a virtual viewpoint image other than a trajectory image will described first in this case, the processing units to be mainly used are a virtual viewpoint determining unit 205, the image generating unit 206, and the user terminals 300 externally connected to the image processing apparatus 100. The virtual viewpoint determining unit 205 determines virtual viewpoint information in accordance with a user's input operation or the like. Virtual viewpoint information contains information indicating at least one of a viewpoint location of a virtual viewpoint and a line-of-sight direction from the virtual viewpoint. Pieces of information contained in virtual viewpoint information are not limited to the above-described examples. For example, information indicating the size of the field of view (angle of view) of a virtual viewpoint may be contained in virtual viewpoint information. The image generating unit 206 generates a virtual viewpoint image in accordance with virtual viewpoint information transmitted from the virtual viewpoint determining unit 205. Hereinafter, the flow of a process at the time when the virtual viewpoint determining unit 205 and the image generating unit 206 generate a virtual viewpoint image other than a trajectory image will be described. The virtual viewpoint determining unit 205 determines at least one of a viewpoint location of a virtual viewpoint and a line-of-sight direction from the virtual viewpoint in accordance with a user's input operation to the user terminal 300 (described later). The virtual viewpoint determining unit 205 transmits the virtual viewpoint information determined in accordance with a user's input operation to the image generating unit 206. The image generating unit 206 obtains, from the material data holding unit 201, material data used to generate a virtual viewpoint image viewed from a virtual viewpoint for the virtual viewpoint information transmitted from the virtual viewpoint determining unit 205. The image generating unit 206 generates a virtual viewpoint image by using the obtained material data, and causes the user terminal 300 to display the generated virtual viewpoint image via an apparatus communication unit 208.

Next, processing units for generating a trajectory image will be described. When a trajectory image is generated, a trajectory generation management unit 203 and a trajectory calculating unit 204 are used in addition to the above. The trajectory generation management unit 203 issues a request to a user for an input operation via the apparatus communication unit 208 and manages information obtained in accordance with the input operation. An input operation to be requested includes an operation for selecting an object that is a target to generate a trajectory image and an operation for designating a range of an image capturing time to generate the trajectory image in the image capturing time during which images of the object are captured. The trajectory generation management unit 203 transmits information obtained from a user's input operation to the trajectory calculating unit 204. The trajectory calculating unit 204 obtains the representative point information on the object that is a target to generate a trajectory image from the object information holding unit 202 in accordance with the information transmitted from the trajectory generation management unit 203. The trajectory calculating unit 204 calculates a trajectory of the representative point of the object that is a target to generate a trajectory image in accordance with the coordinates of the representative point obtained in accordance with the representative point information obtained from the object information holding unit 202. The trajectory calculating unit 204 transmits information indicating the calculated trajectory of the representative point to the virtual viewpoint determining unit 205. The virtual viewpoint determining unit 205 determines virtual viewpoint information that is used to generate a trajectory image by using the information transmitted from the trajectory calculating unit 204 and transmits the virtual viewpoint information to the image generating unit 206. The image generating unit 206 generates a trajectory image in accordance with the virtual viewpoint information transmitted from the virtual viewpoint determining unit 205 and the user's input operation. The processing units for generating a trajectory image are described above. A process of generating a trajectory image will be described in detail later.

A display information generating unit 207 generates information to be displayed on the user terminal 300. The display information generating unit 207 generates, for example, display information that combines graphic data, text data, and the like with a virtual viewpoint image containing a trajectory image generated in the image generating unit 206. The apparatus communication unit 208 transmits or receives data, such as images, speech, and text data, that are exchanged via the communication I/F 105 between the image processing apparatus 100 and the user terminal 300. At this time, the apparatus communication unit 208 performs transmission or reception with a predetermined user in accordance with an instruction from a user information management unit 209. The user information management unit 209 manages user information on each user. User information contains information of a user ID for specifying a user, a user attribute indicating the personal information of the user, a user location indicating a current location, or the like of the user, and a service fee the user pays for usage of the image processing system 200, and the like. Pieces of information contained in user information are not limited to the above-described examples. When the user information management unit 209 transmits or receives various pieces of information between the image processing apparatus 100 and the user terminal 300, the user information management unit 209 associates a process that is executed by the image processing apparatus 100 and the user terminal 300 with user information. Thus, the image processing apparatus 100 realizes execution of different processes and communication of different pieces of information for multiple users.

The user terminal 300 includes the terminal communication unit 301, the display unit 302, the operating unit 303, and the user information providing unit 304. The terminal communication unit 301 transmits or receives data with the apparatus communication unit 208 in the image processing apparatus 100. The display unit 302 is made up of, for example, a liquid crystal display, an LED, or the like and displays a virtual viewpoint image and a graphical user interface (GUI) or the like for enabling a user to operate the image processing apparatus 100. The operating unit 303 is made up of, for example, a keyboard, a mouse, a joystick, a touch panel, or the like, accepts a user's input operation, and transmits information based on the input operation to the image processing apparatus 100 via the terminal communication unit 301. The user is also able to perform an input operation for determining virtual viewpoint information by operating the operating unit 303. An input operation for determining virtual viewpoint information is, for example, an operation to designate a viewpoint location of a virtual viewpoint and a line-of-sight direction from the virtual viewpoint by operating a joystick. The virtual viewpoint determining unit 205 determines virtual viewpoint information in accordance with input information obtained from the user's input operation. A method of determining virtual viewpoint information is not limited to the above method. For example, the virtual viewpoint determining unit 205 may be configured to determine virtual viewpoint information in accordance with user's text input, button depression, or the like for designating a specific scene (for example, a soccer goal scene). In this way, various methods may be used as a user operation for determining virtual viewpoint information. The user information providing unit 304 attaches user information containing a user ID and the like to information to be transmitted from the terminal communication unit 301 to the apparatus communication unit 208.

Type of Material Data and Method of Generating Material Data

Material data in the present embodiment corresponds to images captured by the image capturing apparatuses and data generated in accordance with the captured images. Examples of data generated in accordance with captured images include data of foreground images and background images extracted from the captured images, shape data representing the shapes of objects, texture data for coloring the shape data, and the like. Foreground images are images obtained by extracting regions associated with foreground objects (foreground regions) from captured images captured by the image capturing apparatuses and obtained. Background images are images of regions (background regions) different from at least the foreground regions in captured images. Specifically, background images are images in a state where foreground regions are removed from captured images. Background regions may be regarded as regions associated with background objects in captured images. Shape data is, for example, three dimensional model data representing the three dimensional shapes of objects in a three dimensional space. Shape data in the present embodiment assumes three dimensional model data; however, shape data is not limited to three dimensional model data. Shape data may be based on, for example, image-based rendering.

Hereinafter, an example of a method in which a material data generating unit (not shown) generates material data will be described. The material data generating unit may be configured to be included in the image processing apparatus 100 or may be configured to be externally connected to the image processing apparatus 100 as another device.

An example of a method in which the material data generating unit generates a foreground image and a background image will be described. The material data generating unit detects a region with no change in pixel value by comparing multiple images captured in a continuous period of time by the image capturing apparatuses. The material data generating unit determines that the detected region as a background region and generates a background image in accordance with the region. The material data generating unit compares the generated background image with the captured images, determines a region of which a difference in pixel value is greater than or equal to a predetermined threshold as a foreground region and generates a foreground image based on the region.

An example of a method in which the material data generating unit generates a three dimensional model of an object for a foreground region will be described. The material data generating unit generates a silhouette image of an object, in which the foreground region and the background region are shown in binary value in accordance with the foreground region and the background region determined in the above-described process. At this time, the material data generating unit generates a silhouette image of an object viewed from multiple directions by using images captured from multiple directions. The material data generating unit generates a three dimensional model from multiple silhouette images by using silhouette volume intersection that is a known technology.

The type of material data and the method of generating material data in the present embodiment are described above. Time information similar to that contained in object information is associated with each piece of the above-described material data. Therefore, the image generating unit 206 is capable of obtaining material data for any time. The type of material data is not limited as long as the material data is data for generating a virtual viewpoint image. For example, camera parameters indicating image capturing conditions of each of the image capturing apparatuses that obtain captured images may be contained in material data. Material data may vary depending on a method of generating a virtual viewpoint image. For example, material data may vary between when a virtual viewpoint image is generated by generating a three dimensional model and when a virtual viewpoint image is generated by using a technique of image-based rendering without using a three dimensional model.

Trajectory Image Generating Process

Hereinafter, a process for generating a trajectory image will be described. The image shown in FIG. 3A is a virtual viewpoint image A at time Ta in a five-second virtual viewpoint moving image generated by combining multiple virtual viewpoint images generated in accordance with a user's input operation. P and Q respectively indicate persons in the virtual viewpoint image A, and R indicates a ball in the virtual viewpoint image A. The virtual viewpoint moving image is in a state of being displayed on the display unit 302 of the user terminal 300. Here, an example in which a trajectory image of the person P and the ball R, shown in FIG. 3B, is generated in accordance with the virtual viewpoint image shown in FIG. 3A will be described.

Figure 3C:
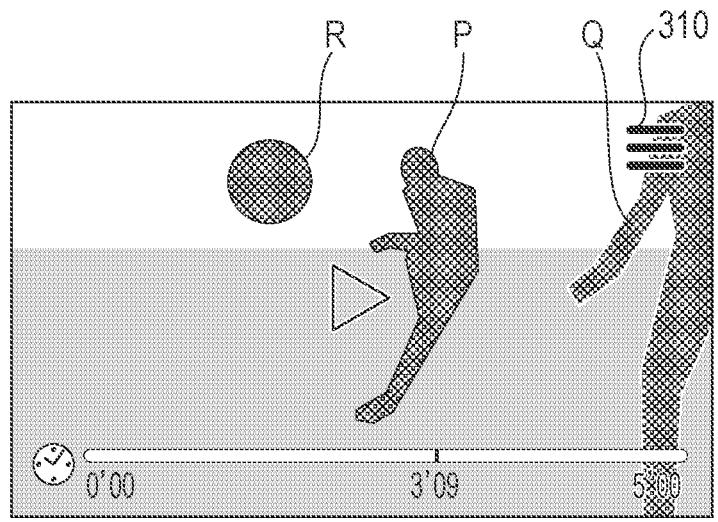

First, a process for selecting a foreground object that is a target to generate a trajectory image will be described. It is assumed that, while a user is viewing a virtual viewpoint moving image, the user thinks at a kick scene that is at Ta=3.9 seconds to want to generate a trajectory image on the person P and the ball R that come into the kick. In this case, the user temporarily stops the playback of the virtual viewpoint moving image. FIG. 3C is a view showing a temporarily stopped screen. A menu icon 310 for displaying various menus is displayed at the top right of FIG. 3C. The user designates the menu icon 310 to display a menu and operates to designate a trajectory image generating mode that is one item of the menu, thus causing the image processing apparatus 100 to start the trajectory image generating process.

Figure 3D:
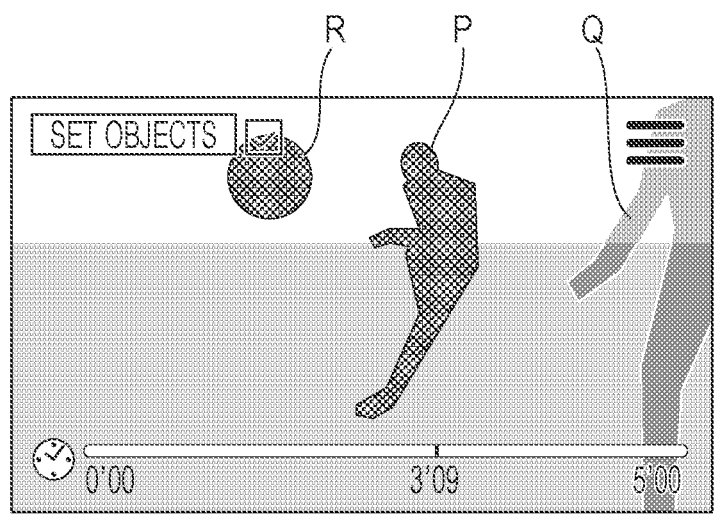

When the trajectory image generating process is started, the trajectory generation management unit 203 issues a request to the user to select a foreground object that is a target to generate a trajectory image. FIG. 3D is a view showing an example of a display screen for selecting a foreground object that is a target to generate a trajectory image (hereinafter, referred to as target foreground object). The user selects one or more foreground objects that are targets to generate a trajectory image while seeing the screen shown in FIG. 3D. The trajectory generation management unit 203 specifies an object that is a target to generate a trajectory image in accordance with a user's input operation for designating a foreground object. In the example shown in FIG. 3D, the person P and the ball R selected by the user as the target foreground objects are displayed in an opaque manner, and the person Q that is a non-target foreground object is displayed in a translucent manner. Before a target foreground object is selected, all the foreground objects are displayed in a translucent manner, and, each time a user performs an operation, such as clicking and touching, on a foreground object, the display mode switches between an opaque selected state and a translucent non-selected state. Other than a difference in transparency, such as translucent and opaque, or a difference in color, such as color and monochrome, may be used as a method of expressing a selected state and a non-selected state. Alternatively, a selected state and a non-selected state may be distinguished by highlighting, such as illuminating and blinking a foreground object in a selected state. Alternatively, a selected state and a non-selected state may be distinguished by displaying a foreground object in a non-selected state with only an outline. Other than the above, a selected state and a non-selected state may be distinguished by synthesizing graphics, such as an arrow and a push pin, and text, such as "selected", near a foreground object in a selected state or combining some of the above-described expressing methods. In this way, various methods are conceivable to express a selected state and a non-selected state. When the user performs an operation to designate a checkmark at the top left of FIG. 3D, the process of selecting a target foreground object is ended. In the following process, it is assumed that non-selected foreground objects are not displayed. Also, in the following process, it is assumed that an object at start point time in a time range to generate a trajectory image is displayed as a background object (for example, a ground in a field, or the like). An example in which a target foreground object is selected in accordance with a user's input operation is described above, however, the configuration is not limited thereto. For example, the trajectory generation management unit 203 may be configured to, when there is only one foreground object, automatically select the foreground object. The trajectory generation management unit 203 may be configured to, when foreground objects are a person and a ball, automatically select the person. For example, when a trajectory image in a soccer game is generated, the user information management unit 209 may hold information on a user's supporting team in advance and, when there are multiple players, the player of the supporting team may be selected in accordance with user information.

Figure 4A:
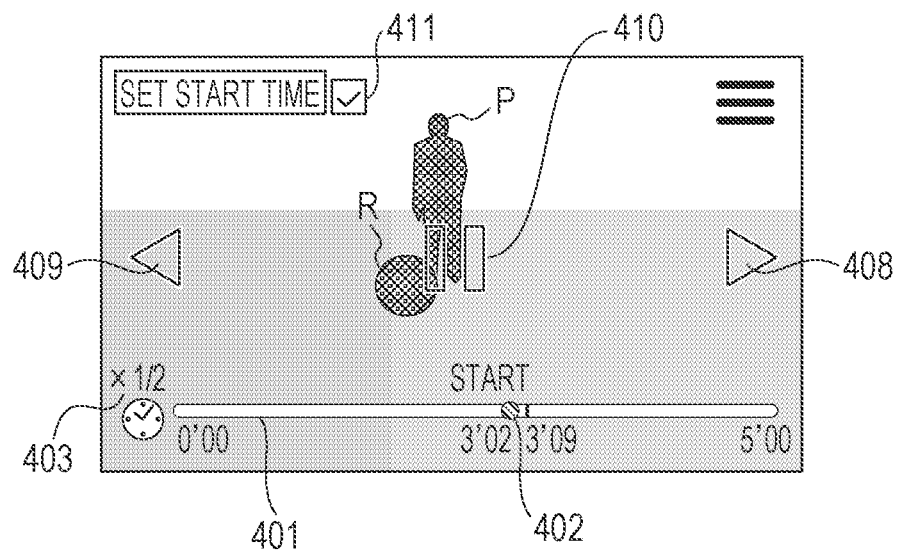
FIG. 4A to FIG. 4D are views for illustrating a process for generating a trajectory image.
Figure 4B:
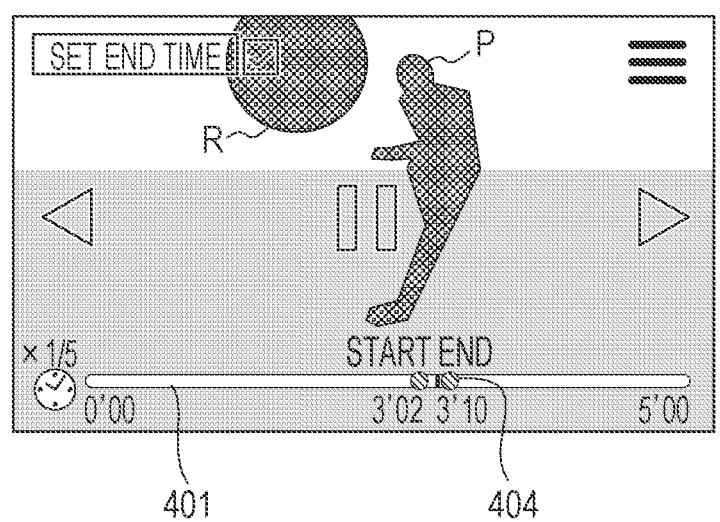

Next, a process for determining a time range to generate a trajectory image will be described. When the process of selecting a target foreground object ends, the trajectory generation management unit 203 issues a request to the user to designate start point time and end point time of a time range to generate a trajectory image. The trajectory generation management unit 203 specifies a time for generating a trajectory image in accordance with the following user operation. FIG. 4A is a view showing an example of a display screen for designating start point time. On the display screen shown in FIG. 4A, temporarily stopped time Ta=3.9 seconds and start point time 402 that is an icon representing start point time are displayed on a time bar 401 at the bottom. A virtual viewpoint image in the screen is a virtual viewpoint image at the start point time 402. Initial start point time is automatically set by the trajectory generation management unit 203. Time equal to Ta, time a certain fixed period of time before Ta, or the like is designated as initial start point time. Other than the above-described example, a scene of a virtual viewpoint image at Ta may be determined by image recognition, or the like and time near the time at which a series of motion (a kick scene in the present embodiment) that is the core of the scene begins may be designated. The user is able to advance the start point time 402 to any time by selecting an icon 408. The user is also able to rewind the start point time 402 to any time by selecting an icon 409. When the icon 408 or the icon 409 is selected once, slow playback of a moving image is started in a time direction indicated by the selected icon. After that, when a temporary stop icon 410 at the center in the screen is selected to temporarily stop the moving image and a checkmark 411 is selected in a temporary stop state, the start point time 402 is determined as current temporary stop time. When the icon 408 or the icon 409 is selected, a playback speed increases each time the same icon is successively selected, and, when playback of the moving image is started again after temporarily stopped once, the playback speed returns to an initial playback speed. A playback speed is displayed at a speed indicator 403. Adjustment of the start point time 402 may also be performed by performing an operation, such as dragging and swiping, the icon representing the start point time 402 on the time bar 401 or directly typing time to a time text display portion under the icon representing the start point time 402. When the start point time 402 is determined, a display screen for designating end point time shown in FIG. 4B is subsequently displayed. End point time is determined by performing a similar operation to the above to end point time 404 on the display screen shown in FIG. 4B. Because end point time is close to Ta=3.9 seconds, time text display "3'9" is omitted in the time bar 401 in FIG. 4B. Through the above process, a time range from the start point time 402 to the end point time 404 is specified as a time range to generate a trajectory image.

Figure 5:
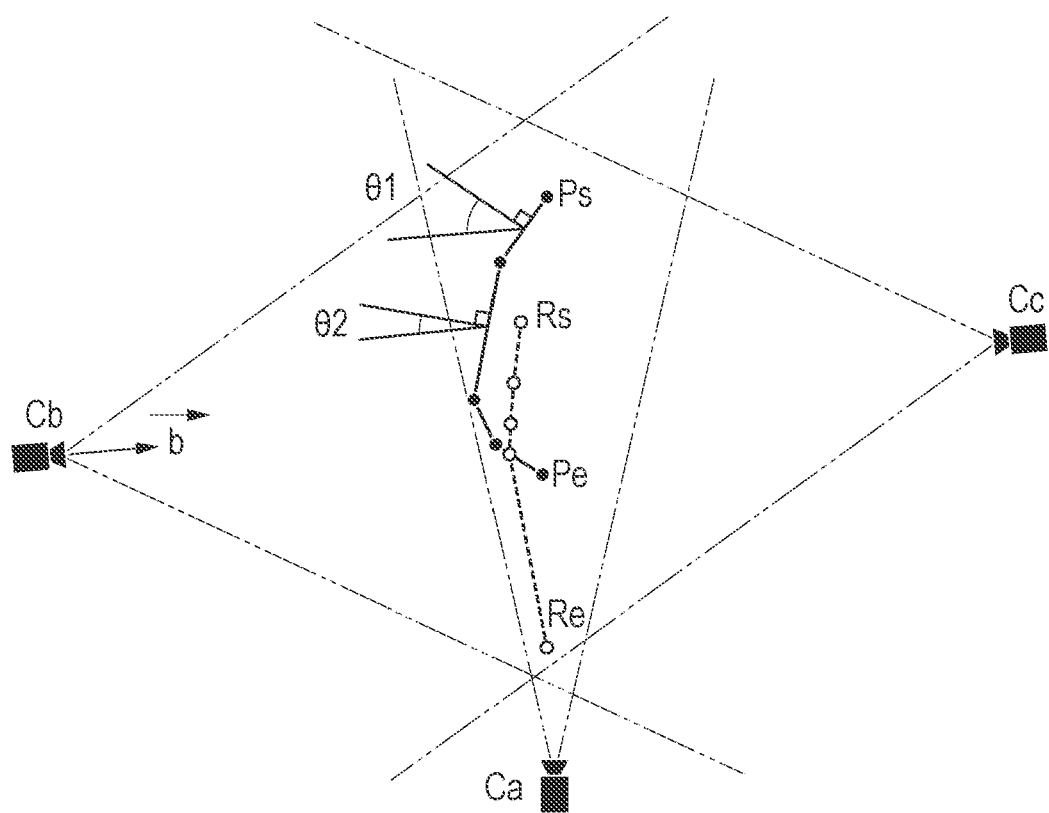
FIG. 5 is a view for illustrating an example of trajectory segments and the arrangement of a virtual camera.

When a time range to generate a trajectory image is determined, the trajectory generation management unit 203 provides an instruction to the trajectory calculating unit 204 to calculate the trajectories of the person P and the ball R that are target foreground objects. The trajectory calculating unit 204 obtains the trajectories of the target foreground objects through the following process. The trajectory calculating unit 204 splits the time range from the start point time to the end point time by a selected time interval. A dividing method may be, for example, equally dividing the time range into a selected number like, when a time range to generate a trajectory image is three seconds in total, the time range is trisected by an interval of one second. Alternatively, the time range may be sequentially split by a fixed time length from the start point time and the last remaining time may be an unequally split time. Alternatively, the motion of each target foreground object may be recognized in accordance with posture recognition information or the like, a period of time during which the motion is hard may be split by a shorter interval, and a period of time during which the motion is gentle may be split by a longer interval in the present embodiment, the time range is quadrisected. As described above, the trajectory generation management unit 203 splits a time range to generate a trajectory image into periods having a predetermined time length and specifies multiple different times (split times) in accordance with the split. A user may be able to select any dividing method from among the above-described dividing methods. The trajectory calculating unit 204 obtains object information on each target foreground object from the object information holding unit 202 and calculates representative point coordinates of each target foreground object at each of start point time, split times, and end point time. Representative point coordinates at each time are calculated in accordance with time information and representative point information contained in the object information. In addition, the trajectory calculating unit 204 calculates trajectory segments each connecting time-series adjacent representative points by using the calculated representative point coordinates at each time. FIG. 5 is a schematic view when trajectory segments are viewed from above. The locations of the representative points at start point time of the person P and the ball R that are the target foreground objects are represented by Ps and Rs, and the locations of the representative points at end point time are represented by Pe and Re. The locations of representative points of the person P and the ball R at each split time between the start point time and the end point time are respectively represented by solid circle and outline circle. Ca is a viewpoint location of a virtual viewpoint, a line-of-sight direction from the virtual viewpoint, and the angle of view at the virtual viewpoint, of the virtual viewpoint image of FIG. 3A. Description will be made on the assumption that, in FIG. 5, a virtual viewpoint is a camera (virtual camera) arranged at a viewpoint location of the virtual viewpoint for the sake of convenience. In other words, the viewpoint location of the virtual viewpoint corresponds to the location of the virtual camera, the line-of-sight direction from the virtual viewpoint corresponds to the orientation of the virtual camera, and the angle of view at the virtual viewpoint corresponds to the angle of view of the virtual camera. A virtual viewpoint image corresponds to an image that is captured by the virtual camera. The trajectory calculating unit 204 transmits information indicating calculated trajectory segments to the virtual viewpoint determining unit 205.

When the virtual viewpoint determining unit 205 obtains the information indicating the trajectory segments, the virtual viewpoint determining unit 205 determines virtual viewpoint information for generating a virtual viewpoint image to be provided to the user at the time of accepting a user operation for generating a trajectory image (hereinafter, referred to as plotting operation). A plotting operation is an operation for designating different points in time in a period during which images of a target foreground object are continuously captured. A plotting operation will be described in detail later. When a user performs a plotting operation, the user performs an input operation for designating an object plot while seeing a target foreground object in a virtual viewpoint moving image that is displayed on the display unit 302. An object plot is the shape data of an object associated with each of the representative points in the above-described trajectory, segments. A virtual viewpoint moving image that is displayed on the display unit 302 at a point in time at which trajectory segments are calculated is a virtual viewpoint moving image that is captured by the virtual camera Ca. In a virtual viewpoint moving image that is captured by the virtual camera Ca, the target foreground objects move from the back toward the front in the screen, so object plots overlap each other, and the visibility of the back-side object is poor. It is desirable that a virtual camera at the time of a plotting operation be, for example, like Cb in FIG. 5 (that is, all Ps to Pe and Rs to Re are included in the angle of view), arranged perpendicularly to the trajectory segments of a target foreground object. Hereinafter, a method of determining the arrangement of a virtual camera for a plotting operation will be described with reference to FIG. 5.

The orientation of a virtual camera, perpendicular wherever possible to all the trajectory segments of multiple target foreground objects, satisfies the following condition.

$$\Sigma\theta = MIN \quad (1)$$

θ is an inferior angle formed between the orientation of the virtual camera and a straight line perpendicular to each of the trajectory segments when the trajectory segments are viewed from above. FIG. 5 shows θ1 and θ2 that are some of inferior angles each formed between an orientation vector b of the virtual camera Cb and an associated one of straight lines respectively perpendicular to the trajectory segments of the person P. The number of trajectory segments of the person P and the ball R is actually eight in total; however, only angles for two segments are shown for the sake of illustration. When the sum of the above-described angles is minimum, it may be regarded that the orientation of the virtual camera is closest to perpendicular to all the trajectory segments. In the present embodiment, it is assumed that the vector b is horizontal. The configuration is not limited thereto. The angle of the vector b in a vertical direction may be determined in accordance with the posture of a person at the time when the person watches an object. The height of the virtual camera is set to an average value of coordinates, in a height direction, of pieces of shape data for object plots at Ps to Pe and Rs to Re. Thus, object plots are displayed in a screen center region of the display unit 302. With the above method, the virtual viewpoint determining unit 205 determines the virtual viewpoint information on the virtual camera Cb suitable for a plotting operation. For a virtual camera Cc arranged at a location across from the virtual camera Cb in FIG. 5 as well, the above-described conditions are the same. At the time of a plotting operation (described later), the condition in which the arrangement direction of object plots coincides with the direction of a time bar keeps with humans natural time recognition, so it is desirable that the virtual camera Cb that provides a virtual viewpoint image in which Ps and Rs be placed on the left side. The virtual viewpoint determining unit 205 calculates a moving path along which the virtual camera is moved from Ca to Cb in accordance with the determined virtual viewpoint information on the virtual camera Cb. The position of the virtual camera may be switched instantaneously or may be changed continuously. When the virtual camera is moved such that a position of the virtual camera changes continuously, the virtual camera in moving may be oriented to a target foreground object. The image generating unit 206 generates a virtual viewpoint image in accordance with the moving path of the virtual camera, calculated by the virtual viewpoint determining unit 205, and causes the display unit 302 to display the virtual viewpoint image. Finally, a virtual viewpoint image captured by the virtual camera Cb is displayed on the display unit 302. In the above description, all Ps to Pe and Rs to Re are included in the angle of view. When a target foreground object moves by turning at a large angle halfway through, virtual viewpoint information may be calculated separately for one before the turn and one after the turn and the virtual camera may be moved as needed before and after the turn. When a trajectory segment is long, it may be estimated that the virtual camera is located far from a target foreground object when the trajectory segment is tried to be included in the angle of view of the virtual camera. In this case as well, a trajectory segment may be split at any split time, and virtual viewpoint information in which each of the split segments is included in the angle of view may be calculated. Thus, it is possible to suppress the virtual camera that places each of the segments in the angle of view is located too far apart from a target foreground object. When there is a large number of target foreground objects or when multiple target foreground objects move in completely different directions, virtual viewpoint information for a plotting operation may be calculated by giving a higher priority to the trajectory of a main target foreground object. A main target foreground object may be determined in accordance with a user's operation or may be automatically determined by performing image analysis on a virtual viewpoint moving image. For example, when target foreground objects are a person and a hall, the person may be automatically determined as a main target foreground object.

Figure 4C:
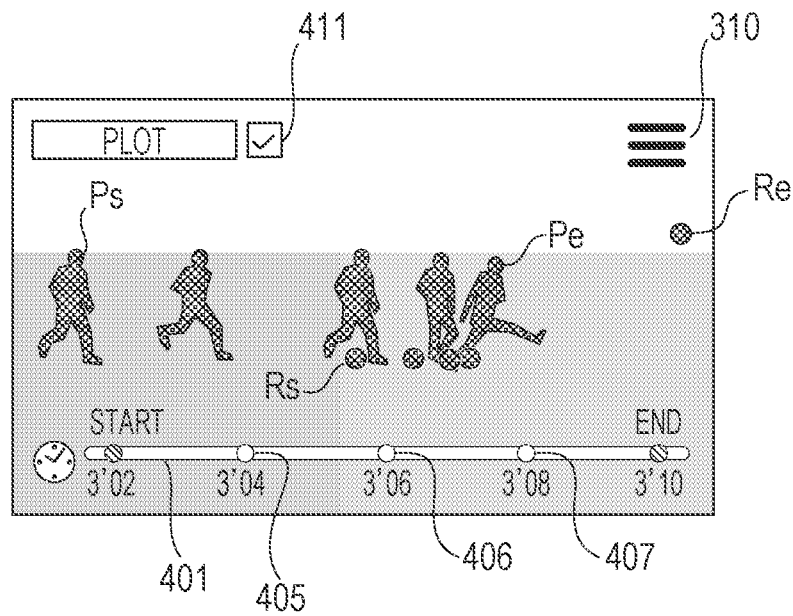
Figure 4D:
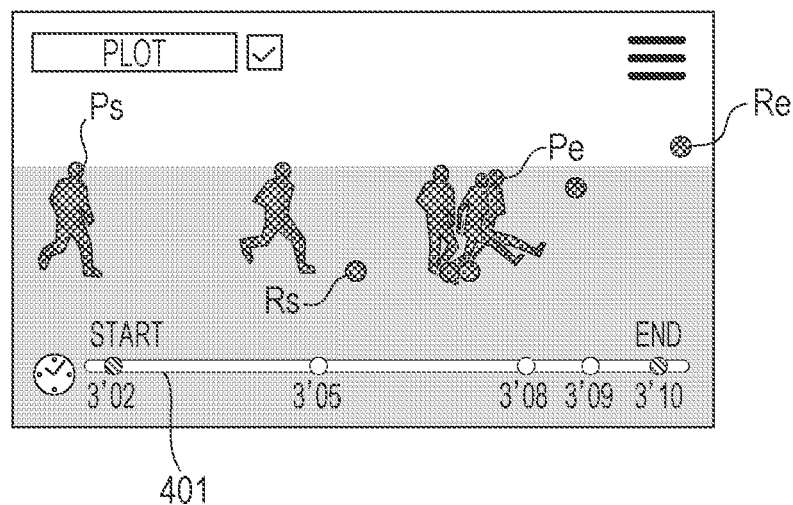

Next, a plotting operation will be described. FIG. 4C is an example of a display screen that is displayed on the display unit 302 when a user designates an object plot. As the virtual camera moves to Cb, the display unit 302 displays the person Ps and the ball Rs that are pieces of shape data of the target foreground objects at start point time and the person Pe and the ball Re that are pieces of shape data of the target foreground objects at end point time. Together with the above shape data, the pieces of shape data of the target foreground objects at each split time, calculated in the trajectory calculating unit 204, are displayed. These pieces of shape data are called object plots. Pieces of shape data that are displayed on the display unit 302 as the virtual camera moves to Cb are set as initial object plots. Times (plot times) 405 to 407 for the object plots are displayed on the time bar 401 at the bottom of the screen. When a plotting operation is started, plot time for the initial object plots is displayed. At this time, a time range indicated by the time bar 401 is changed from the total length of time of the virtual viewpoint moving image as shown in FIG. 4A to a target time range to generate a trajectory image. A user is able to make any change on the plot times 405 to 407 on the time bar 401 by performing an operation, such as dragging and swiping, or by directly typing time in time text display portions below the plot times 405 to 407. A user is also able to delete or add plot time from the menu icon 310. Therefore, an initial object plot may be not displayed when a plotting operation is started. In the above-described plotting operation, the image generating unit 206 obtains, from the material data holding unit 201, material data containing shape data for plot time according to change, deletion, or addition of the plot time and generates a virtual viewpoint image by using the obtained shape data. As shown in FIG. 4D, when the user completes designation of all plot times, the user ends the plotting operation by designating the checkmark 411. Upon accepting a user operation to end the plotting operation, the image generating unit 206 obtains multiple pieces of shape data for the determined plot times and generates a virtual viewpoint image (trajectory, image) containing the multiple pieces of shape data. Therefore, the image generating unit 206 generates a final trajectory image shown in FIG. 3B. A user is able to view object plots from any viewpoint by performing an operation for changing the viewpoint location of the virtual viewpoint and the line-of-sight direction from the virtual viewpoint on the generated trajectory image. Thus, it is possible to observe an object at each of different points in time from a desired viewpoint. Unless a request is issued from a user, the image processing apparatus 100 may decrease the image quality (resolution, color tone, and the like) of each object plot during a plotting operation to increase processing speed. In the above description, the image generating unit 206 is configured to obtain shape data for plot time each time the plot time is changed, deleted, or added; however, the configuration is not limited thereto. The image generating unit 206 may be configured to, upon accepting a user operation for ending the plotting operation, obtain shape data for plot time at that point in time. A user operation in the plotting operation is not necessarily performed. A trajectory image may be generated in accordance with, for example, an initial object plot that is generated as the virtual camera moves to Cb.

The trajectory image generating process is described above. The overall flow of the trajectory image generating process that is executed by the image processing apparatus 100 will be described by using the flowchart shown in FIG. 6. The process shown in FIG. 6 is implemented by the CPU 101 reading out a program stored in the ROM 102 or the auxiliary memory device 104 and executing the program. When the image processing apparatus 100 accepts a user's input operation for starting the trajectory image generating process, the process is started. In the following description, a process step is simply referred to as "S".

In S601, the trajectory generation management unit 203 accepts a user's input operation for selecting a target foreground object and determines the target foreground object in accordance with the input operation. In S602, the trajectory generation management unit 203 determines start point time in a time range to generate a trajectory image in accordance with a user operation. In S603, the trajectory generation management unit 203 determines end point time in the above time range in accordance with a user operation. In S604, the trajectory calculating unit 204 calculates trajectory, segments of the target foreground object in the time range between the start point time determined in S602 and the end point time determined in S603. At this time, the trajectory calculating unit 204 calculates trajectory segments by splitting the above-described time range and calculating coordinates of a representative point of the target foreground object for each split time. In S605, the virtual viewpoint determining unit 205 determines virtual viewpoint information for a plotting operation in accordance with the trajectory segments calculated in S604. In S605, the image generating unit 206 moves a virtual viewpoint in accordance with the virtual viewpoint information determined in S604. The image generating unit 206 displays a display screen for a plotting operation, generated in accordance with the moved virtual viewpoint. In S607, the image generating unit 206 accepts a user's plotting operation and determines plot times in accordance with the plotting operation. In S608, the image generating unit 206 obtains multiple pieces of shape data for the plot times determined in S607 and generates a virtual viewpoint image (trajectory image) containing the obtained multiple pieces of shape data. When the generated trajectory image is displayed on the display unit 302, the process ends.

Figure 7A:
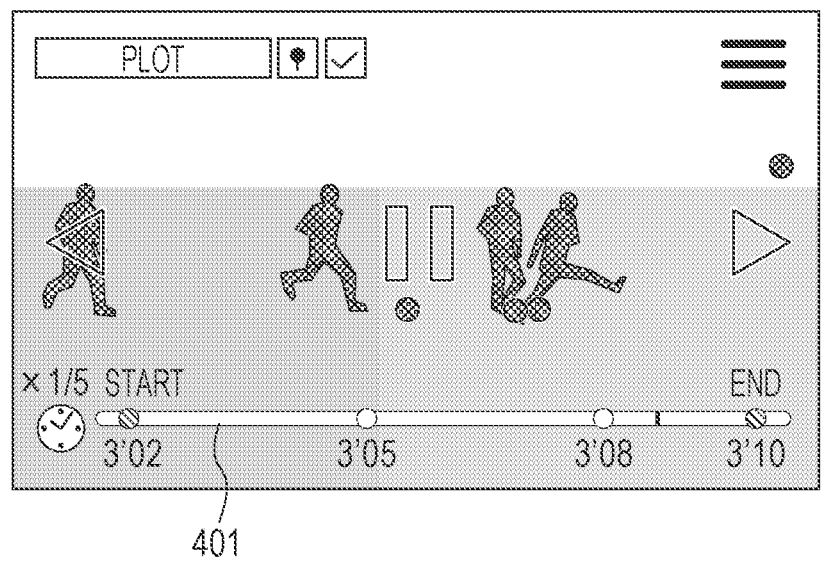
FIG. 7A and FIG. 7B are views for illustrating another embodiment.

Another example of a display screen that is displayed on the display unit 302 at the time of a plotting operation will be described with reference to FIG. 7A. In the example shown in FIG. 7A, only object plots at start point time and end point time are displayed when a plotting operation is started. A user, as in the case of an operation to designate start point time and end point time, views slow playback of a moving image and sets the moving image in a temporary stop state at any time. The user is able to designate each plot time by performing an operation to designate the pushpin mark next to the checkmark in the temporary, stop state. The vertical line on the time bar 401 in FIG. 7A is a playback position. The user finishes the plotting operation by selecting the checkmark after designation of plot times is complete. The display screen shown in FIG. 7A described above may be switched from the display screen shown in FIG. 4C at the time of a start of work or during working in response to a user's demand.

Figure 7B:
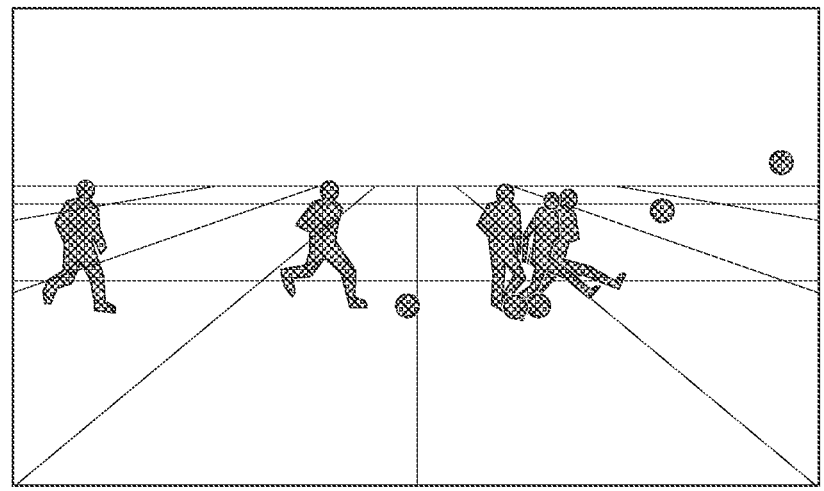

In the above-described embodiment, in a process after a target foreground object is selected, a non-selected foreground object is not displayed; however, the configuration is not limited thereto. For example, as well as a background object, a non-selected foreground object for start point time may be displayed. Alternatively, even in a process after a target foreground object is selected, a non-selected foreground object may be displayed by the method of expressing a non-selected state in the above-described embodiment (in a translucent state, in a monochrome state, or with an outline). In a process after a target foreground object is selected, a background object at start point time is displayed as a background object, such as the ground of a field; however, the configuration is not limited thereto. A background object may be configured not to be displayed. A background object at time other than start point time may be displayed. A background object at predetermined time in a time range, for example, end point time of a time range to generate a trajectory, image, intermediate time in the time range, or the like, may be displayed. Alternatively, the predetermined time may be designated by a user. Alternatively, time at which a competition is most exciting or time of a crucial scene (such as an instance at which the object P kicks the ball R in the above-described embodiment) of a target foreground object, specified by at least any one of speech recognition, image recognition, and the like, may be designated as the predetermined time. By recognizing speech, such as shouts of spectators with pleasure in a soccer game, cheers for separate teams in a baseball game, and public address announcement in a stadium, time at which a competition is most exciting, time at which an important event has occurred, or the like may be specified. Alternatively, by performing image recognition on multiple images captured by the multiple image processing apparatuses or a virtual viewpoint image generated by the image processing apparatus 100, the above-described time may be specified. Similarly, for the above-described non-selected foreground object, a non-selected foreground object at the predetermined time may be displayed. Instead of an object other than a target foreground object, a plain or lattice pattern flat surface that enables only space recognition of a top, bottom, front, rear, or the like may be displayed. FIG. 7B is an example of the case where a lattice pattern flat surface is displayed instead of the ground of a field. With the display method shown in FIG. 7B, objects other than target foreground objects do not need to be drawn, so the effect of reducing a processing load on drawing objects is obtained. In addition, by drawing only a target foreground object in a three dimensional space as shown in FIG. 7B, the effect of making it possible to perform analysis, or the like while seeing only the target foreground object is obtained. Furthermore, a combination of any methods from among the above-described display methods may be used, or a user may select any method.

In the above-described embodiment, an example in which the virtual viewpoint determining unit 205 determines virtual viewpoint information for generating a trajectory image in accordance with information indicating trajectory segments is described; however, the configuration is not limited thereto. The virtual viewpoint determining unit 205 is also capable of determining virtual viewpoint information for generating a trajectory image in accordance with a user operation. For example, after S603 of FIG. 6, a user operates the operating unit 303 and performs input for determining a viewpoint location of a virtual viewpoint and a line-of-sight direction from the virtual viewpoint. Information input by the user is transmitted to the virtual viewpoint determining unit 205 via the terminal communication unit 301 and the apparatus communication unit 208. The virtual viewpoint determining unit 205 determines virtual viewpoint information for generating a trajectory image in accordance with information input through a user operation. Through this step, the user is able to generate a trajectory, image based on a desired virtual viewpoint. In the above-described embodiment, an example in Which a virtual viewpoint is switched only when a plotting operation is started is described; however, the configuration is not limited thereto. In a period from selection of a target foreground object to a plotting operation, a user is able to perform an operation to change a viewpoint location of a virtual viewpoint and a line-of-sight direction from the virtual viewpoint at any time.

A target foreground object, start point time, and end point time, after once determined along the above-described operation method, may be changed at any time. For example, a menu that is displayed by designating the menu icon 310 may prepare an item related to designation of a target foreground object and designation of start point time and end point time, and a processing step may be returned by selecting any item. In the above-described embodiment, object plots are generated at plot times common to multiple target foreground objects. Alternatively, different plot times for individual target foreground objects may be designated. In the above-described embodiment, the trajectory generation management unit 203 specifies a time range to generate a trajectory image by determining start point time and end point time in accordance with a user operation; however, the configuration is not limited thereto. For example, the trajectory generation management unit 203 may be configured to generate a trajectory image for a predetermined length of time and, when start point time is determined in accordance with a user operation, automatically specify a time range from the determined start point time to time advanced by the predetermined length of time. Similarly, the trajectory generation management unit 203 may be configured to, when end point time is determined in accordance with a user operation, automatically specify a time range from the determined end point time to time rewound by the predetermined length of time. The trajectory generation management unit 203 may also be configured to specify a time range for a scene in which a predetermined event has occurred in accordance with a recognition result of at least any one of speech recognition, image recognition, and the like, as described above. In this case, for example, a time range for a scene, such as a goal scene and penalty kick in a soccer game, a time range from a jump point to landing of the high jump in a track-and-field competition, or the like may be specified. The trajectory generation management unit 203 may also be configured to specify a time range of a scene of an associated event in accordance with text (for example, goal scene) typed by a user operation. Furthermore, the trajectory generation management unit 203 may be configured to display an icon (for example, a button labelled "goal scene") for specifying a time range on the display unit 302 and, when detecting a user operation for designating the icon, specify an associated time range.

In the above-described embodiment, a trajectory image to be generated is a still image, and a virtual viewpoint moving image may be displayed in a superimposed manner on the trajectory image. A virtual viewpoint moving image to be superimposed at this time is a virtual viewpoint moving image that is generated in accordance with virtual viewpoint information used when a trajectory image is generated. For example, on the trajectory image shown in FIG. 3B, a virtual viewpoint moving image viewed from the same viewpoint as the virtual viewpoint for the trajectory image and associated with a time range to generate the trajectory image is superimposed. Thus, it is possible to generate a moving image that enables recognition of a scene in which target foreground objects move along object plots while a trajectory image is displayed at the same time. In this case, an expression may be differentiated by, for example, displaying in a translucent state or in a low chromes state any one of part or all of object plots and a virtual viewpoint moving image. Alternatively, by sequentially displaying an object plot at time in association with a lapse of time of a virtual viewpoint moving image to be superimposed, a virtual viewpoint moving image that provides an afterimage of a target foreground object in the moving image may be generated. A trajectory image in the present embodiment is a still image. A trajectory image may be a moving image. In this case, the image processing apparatus 100 may be configured to generate a moving image in which a target foreground object moves by combining multiple trajectory images at different times for object plots. When an object plot is displayed, a virtual viewpoint image that highlights only one for time or a target foreground object designated by a user of multiple object plots or that sequentially highlights multiple object plots with time may be generated. A highlight may be expressed by various methods as in the case of the above-described method of expressing a foreground object in a selected state or in a non-selected state. A highlight is effective, for example, when multiple object plots overlap each other, when a time relation between object plots of different target foreground objects is intended to be grasped, or when only a specific object is intended to be displayed with a highlight from among multiple target foreground objects. When object plots overlap each other, the effect of making it easy to observe an object model is obtained by displaying an object plot at predetermined time with a highlight. When a time relation between object plots of different target foreground objects is intended to be grasped, the effect of making it easy to recognize target foreground objects for the same time is obtained by displaying multiple target foreground objects (for example, the person P and the ball R) for the same time with a highlight. When there are multiple target foreground objects, the effect of making it easy to observe a specific target foreground object while recognizing multiple foreground objects is obtained by displaying only the specific target foreground object with a highlight. As a technique for grasping a time relation between multiple target foreground objects, a method of synthesizing the text of plot time near each object plot is conceivable. When an object other than a target foreground object is displayed in association with the above-described highlighting, an object at time same as the plot time of a highlighted object plot may be displayed.

In the above-described embodiment, the mode in which material data and object information are respectively held in the material data holding unit 201 and the object information holding unit 202 as different data is described; however, the configuration is not limited thereto. Material data and object information may be held in the same data file. In this case, when, for example, object information and time information are stored in a metadata area of a material data file, these pieces of data are collectively managed in a single file. By consulting time information stored in a metadata area, both material data and object information at any time are easily acquired. Object information stored in a metadata area may be used at the time of searching for material data. For example, when shape data related to a specific player is intended to be obtained, the shape data of the player is easily obtained by making a search by using the identification information (for example, the name and the like of the player) of the player.

Of the above-described various embodiments, a combination of some of the embodiments may be implemented.

As described above, the image generating unit 206 in the present embodiment obtains, from the material data holding unit 201, multiple pieces of shape data representing a specific object (target foreground object), captured at different times in a specific time range. The virtual viewpoint determining unit 205 determines virtual viewpoint information indicating at least any one of a viewpoint location of a virtual viewpoint and a line-of-sight direction from the virtual viewpoint. The image generating unit 206 generates a virtual viewpoint image (trajectory image) containing the obtained multiple pieces of shape data in accordance with the determined virtual viewpoint information. The virtual viewpoint image that is generated by the image generating unit 206 is a still image representing the trajectory of temporal changes of a specific object in a specific time range. With the above configuration, the image processing apparatus 100 is capable of, for a specific object of which images are continuously captured, generating a comparable virtual viewpoint image containing images of the specific object at different points in time and viewed from a desired viewpoint.

According to the above-described embodiment, it is possible to, for a specific object of which images are continuously captured, display a comparable virtual viewpoint image containing images of the specific object at different points in time and viewed from a desired viewpoint.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-126338, filed Jul. 5, 2019, which is hereby incorporated by reference herein in its entirety.

What is claimed is:

1. An image processing apparatus comprising:
one or more processors functioning by executing instructions stored in one or more memories as the following units:
an obtaining unit configured to obtain shape data representing a shape of an object, the shape data being generated based on a plurality of captured images captured by a plurality of image capturing apparatuses;
a determining unit configured to determine a viewpoint parameter representing at least one of a position of a virtual viewpoint and a view direction from the virtual viewpoint used for generating a virtual viewpoint image that is generated based on the captured images; and
a generating unit configured to, based on the viewpoint parameter determined by the determining unit and a plurality of pieces of the shape data that are obtained by the obtaining unit and that respectively corresponds to the object at different points in time in a period in which the object is continuously captured by the plurality of image capturing apparatuses, generate a virtual viewpoint image including images representing the object viewed from the virtual viewpoint corresponding to the viewpoint parameter determined by the determining unit at the different points in time,
wherein, in a case where the viewpoint parameter determined by the determining unit is changed, the generating unit generates a virtual viewpoint image including the images representing the object viewed from the virtual viewpoint corresponding to the changed viewpoint parameter at the different points in time.

2. The image processing apparatus according to claim 1, wherein the one or more processors further function as the following unit:
a time specifying unit configured to specify a time range including the different points in time, and
the generating unit is configured to generate a virtual viewpoint image including the images representing the object at different points in time in the time range specified by the time specifying unit.

3. The image processing apparatus according to claim 2, wherein
the time specifying unit is configured to specify the time range based on a user operation for designating at least any one of start point time and end point time.

4. The image processing apparatus according to claim 2, wherein
the time specifying unit is configured to specify the time range based on a recognition result of at least any one of sound recognition and image recognition.

5. The image processing apparatus according to claim 4, wherein
the time range is a time range associated with a scene in which a predetermined event has occurred in an image capturing area captured by the plurality of image capturing apparatuses.

6. The image processing apparatus according to claim 1, wherein the one or more processors further function as the following unit:
an object specifying unit configured to specify one or more objects from among a plurality of objects captured by the plurality of image capturing apparatuses,
the obtaining unit is configured to obtain shape data that represents the one or more shapes of objects specified by the object specifying unit, and
the generating unit is configured to, based on the viewpoint parameter determined by the determining unit and a plurality of pieces of the shape data obtained by the obtaining unit, generate a virtual viewpoint image including images of each of the one or more objects at the different points in time.

7. The image processing apparatus according to claim 6, wherein
the object specifying unit is configured to specify the one or more objects based on a user operation.

8. The image processing apparatus according to claim 1, wherein
the different points in time are designated based on a user operation.

9. The image processing apparatus according to claim 1, wherein
the different points in time are specified by dividing the period in which the object are continuously captured into a plurality of periods having a predetermined time length.

10. The image processing apparatus according to claim 1, wherein
the determining unit is configured to determine the viewpoint parameter based on positions of the object at the different points in time.

11. The image processing apparatus according to claim 10, wherein
the determining unit is configured to determine the viewpoint parameter such that the positions of the object at the different points in time are included in an angle of view of the virtual viewpoint.

12. The image processing apparatus according to claim 10, wherein
the determining unit is configured to determine the viewpoint parameter based on a line segment connecting the positions of the object at the different points in time.

13. The image processing apparatus according to claim 1, wherein
the generating unit is configured to generate a moving image based on the viewpoint parameter determined by the determining unit and the plurality of captured images.

14. The image processing apparatus according to claim 1, wherein
the generating unit is configured to generate a virtual viewpoint image including an image of the object at specific time with highlight among the images of the object at the different points in time.

15. The image processing apparatus according to claim 1, wherein the viewpoint parameter determined by the determining unit further represents an angle of view of the virtual viewpoint.

16. A display method comprising:
determining a viewpoint parameter representing at least one of a position of a virtual viewpoint and a view direction from the virtual viewpoint used for generating a virtual viewpoint image based on a plurality of images captured by multiple image capturing apparatuses; and
displaying, based on the determined viewpoint parameter and a plurality of pieces of shape data representing an object at different points in time in a period in which the object is continuously captured by the plurality of image capturing apparatuses, a virtual viewpoint image including images representing the object viewed from the virtual viewpoint corresponding to the determined viewpoint parameter at the different points in time,
wherein, in a case where the determined viewpoint parameter is changed, a virtual viewpoint image including the images representing the object viewed from the virtual viewpoint corresponding to the changed viewpoint parameter at the different points in time is displayed.

17. A non-transitory computer-readable storage medium storing a program for causing a computer to execute a display method, the method comprising:
determining a viewpoint parameter representing at least one of a position of a virtual viewpoint and a view direction from the virtual viewpoint used for generating a virtual viewpoint image based on a plurality of images captured by multiple image capturing apparatuses; and
displaying, based on the determined viewpoint parameter and a plurality of pieces of three dimensional shape data representing an object at different points in time in a period in which the object is continuously captured by the plurality of image capturing apparatuses, a virtual viewpoint image including images representing the object viewed from the virtual viewpoint corresponding to the determined viewpoint parameter at the different points in time,
wherein, in a case where the determined viewpoint parameter is changed, a virtual viewpoint image including the images representing the object viewed from the virtual viewpoint corresponding to the changed viewpoint parameter at the different points in time is displayed.

* * * * *